United States Patent [19]
Clark et al.

[11] Patent Number: 4,740,338
[45] Date of Patent: Apr. 26, 1988

[54] ELONGATED TUBESHEETS FOR HOLLOW FIBER TYPE BATTERY CELLS

[75] Inventors: Daniel O. Clark, Benicia; Floris Y. Tsang, Walnut Creek; Paul A. Damrow, Concord, all of Calif.

[73] Assignee: The Dow Chemical Company, Midland, Mich.

[21] Appl. No.: 843,545

[22] Filed: Mar. 25, 1986

Related U.S. Application Data

[62] Division of Ser. No. 635,778, Jul. 30, 1984, Pat. No. 4,594,289.

[51] Int. Cl.⁴ .............................................. C04B 35/64
[52] U.S. Cl. ....................................... 264/61; 264/62; 264/67; 264/69; 264/104
[58] Field of Search .................. 264/61, 138, 257, 62, 264/67, 69, 104

[56] References Cited

U.S. PATENT DOCUMENTS

| | | | |
|---|---|---|---|
| 3,554,887 | 1/1971 | Feehs | 204/163 |
| 4,219,613 | 8/1980 | Anand et al. | 429/104 |
| 4,265,763 | 5/1981 | Bollinger et al. | 210/323.2 |
| 4,296,052 | 10/1981 | Anand et al. | 264/104 |
| 4,310,607 | 1/1982 | Shay | 429/104 |
| 4,424,127 | 1/1984 | Roeraade | 210/198.2 |

Primary Examiner—James Derrington

[57] ABSTRACT

Several advantages as to ease of cell fabrication, maximum cell size, fiber breakage, tubesheet tightness, resistance to tubesheet deformation in prolonged service, safety, etc., can be realized by using as the tubesheet in a hollow fiber type battery cell one which is elongated in shape, has a substantially smaller diameter than the fiber "bundle" depending from it and in which the fiber ends passing through it are closely packed.

8 Claims, 3 Drawing Sheets

ELONGATED TUBESHEETS FOR HOLLOW FIBER TYPE BATTERY CELLS

CROSS-REFERENCE TO RELATED APPLICATION

This is a divisional of application Ser. No. 635,778, filed July 30, 1984, now U.S. Pat. No. 4,594,289, issued June 10, 1986.

BACKGROUND OF THE INVENTION

Hollow fiber type battery cells—as exemplified by high temperature, sodium/sulfur cells—have heretofore utilized disc-shaped tubesheets. See U.S. Pat. Nos. 3,476,062; 3,672,995; 3,697,480; 3,703,412; 3,749,603; 3,765,944; 3,791,868; 3,829,331; 3,917,490; 4,050,915; 4,219,613; 4,224,386; 4,296,052; 4,332,868 and 4,403,742—the disclosures of which are incorporated herein by reference, for all purposes which legally may be served thereby.

In the cells disclosed in the latter patents, the fibers terminate and open upon the "outer" or "upper" face of the tubesheet and depend as closed-ended lengths from the inner or lower face. The open ends communicate with an anode compartment and the closed-ended portions—together with intervening wraps of a current collecting/distributing aluminum foil—are immersed in the catholyte. The tubesheet periphery is sealingly engaged with at least the anolyte container and thus separates the anode and cathode materials; it is also electronically non-conductive. The fiber walls are "permeable" to cations of the anode material (molten sodium, for example), and the (conductive) anode material and the foil are connected by electrical lead posts to an external electrical circuit when the cell is in operation.

Particularly pertinent to the present invention are two patents in the preceding list, namely, U.S. Pat. Nos. 4,219,613 and 4,296,052. The '613 patent is directed to an assembly of a hollow fiber bundle and a helium-tight tubesheet of graded porosity (the latter resulting in better stress distribution on the fibers where they "enter" the tubesheet). The '052 patent concerns a two-step ("bake and broil") method of attaining the graded porosity during "firing" of the tubesheet, and constitutes the nearest known prior art firing method.

Difficulties have been encountered in attempting to scale up cells of the type disclosed in the above-listed patents. For example, as a consequence of the sizes of some of the particles from which the tubesheets employed must be formed and of the low glass transition temperatures of the solder glasses which have been found suitable for the methods of tubesheet fabrication used, the disc-shaped tubesheets employed in the prior art cells are too easily deformed, at elevated cell operation temperatures. Under the combined influences of gravity and the pressure differential resulting from transfer of material from the anode compartment to the cathode compartment during discharge, deformation occurs. The extent of deformation in a single discharge half-cycle is not large but the incremental deformation is not effectively reversed during recharging of the cell. Thus, deformation accumulates during prolonged charge/discharge cycling of the cell. This problem (which is not disclosed or suggested in the prior art) would be expected to become rapidly more severe as the diameter of the tubesheet is increased. Since as little as about a 10 mil (254 micron) deformation may cause fiber breakage, it will be appreciated that deformability is a real obstacle to scale up of cells in which the tubesheet is of the disc type.

Another, considerable, obstacle is the difficulty of fabricating larger, leak-free assemblies of hollow fiber bundles and disc-type tubesheets by the one-step method disclosed in the prior art. That is, when a "ladder" of parallel fiber lengths, wrap-spacing and fiber-spacing foil tapes and a cathode foil are rolled up together around a rotating, horizontal mandrel, the portions of the fibers which are to extend through the tubesheet extend substantially beyond the end of the mandrel. These protruding portions are unsupported and are deflected downwardly as the tubesheet material (a pasty slurry of glass particles in a volatilizeable liquid medium) is deposited on (and between) them. As the developing roll rotates, the sagging fiber portions are lifted, bowed even more and subjected to a twisting action. The resultant flexing makes proper placement of more slurry awkward at best and is not very helpful to formation of a body in which the slurry is uniformly distributed around and between the fibers; it is difficult to prepare tubesheet/fiber assemblies by this method which do not require some type of post-firing treatment to render them leak-free. This is particularly so for larger diameter tubesheets of the prior art type.

It is possible to make useable disc-type tubesheets by other than the "bake and broil" method. That is, the advantages of a graded porosity in the tubesheet may be dispensed with for the sake of the lower number of leak paths which results when the tubesheet is more uniformly densified. However, this requires extremely critical, close control of the firing time and temperature, in order to ensure adequate melting of the tubesheet material and bonding to the fibers, without closing off an excessive proportion of the fibers at the same time.

Thus, it is apparent that a tubesheet configuration which would avoid the foregoing problems is highly to be desired.

Another problem with disc-type tubesheets—particularly the more highly densified versions thereof—is that substantial contraction occurs as the liquid slurry medium is removed and densification occurs. The greatest displacement, by circumferential and radial shrinkage, occurs in the peripheral portion of the tubesheet, resulting in "mud-cracking". Thus, as the tubesheet diameter is increased, the cracking becomes so extensive as to render the disc non-functional for its intended purpose.

It will be seen that the most readily apparent solution to the deformation problem, thickening the tubesheet, would aggravate, at least, the difficulty of forming the "green" tubesheet/fiber (etc.) assembly. However, if the amount of the tubesheet material could be reduced, i.e., if the spacing between the fibers within the tubesheet could be considerably reduced, an elongated tubesheet of correspondingly reduced diameter would result. The tubesheet would be highly resistant to deformation. But another problem is posed. The latter modification would require holding the fiber ends together during introduction of the slurry or "squeezing out" some of the slurry; neither expedient worked when tried. It would also necessitate spacing the tubesheet further out along the mandrel axis from the rest of the assembly, to avoid excessively sharp bending of the outermost fibers, particularly upon scale up to larger diameter assemblies. This would increase the sagging and flexing during rolling, due to the greater leverage and even though less slurry was applied.

In addition, the spherical particles included with the ground glass in the tubesheet slurry (to ensure extrudeability of the pasty slurry and efficient, more uniform particle packing in the green tubesheet) would have to be removed in order to attain close packing of the fiber ends. This in turn would require using a more dilute slurry (to retain extrudeability) and would have the consequence of even greater shrinkage during drying and firing of the tubesheet. It would also make initial retention of the slurry on the rotating fiber "brush" much more difficult.

Yet another apparent difficulty with going to an elongate or "plug" tubesheet configuration is that the butt-type seals employed in the prior art for joining the cathode (and anode) cup(s) to the periphery of the disc-type tubesheet would not appear to be very practical for relatively small diameter tubesheets. This would necessitate using an overlapping, concentric ("sleeve") type of seal and such seals are notoriously more difficult to form as strain-free bodies.

It will be recognized that a plug tubesheet—if somehow attainable—would have a substantial safety benefit. That is, breakage of a disc-type tubesheet in an active cell can result in immediate contact between relatively large amounts of anode and cathode materials and an ensuing, highly exothermic, chemical reaction; temperatures so high as to initiate an extremely vigorous reaction between the sulfur in the catholyte (in a sodium/sulfur cell, for example) and the aluminum foil may result. In contrast, breakage of a plug tubesheet (at least in a "two-compartment" cell) would result in exposure of only very limited amounts of the anode and cathode materials to contact with each other.

Thus, despite the uncertainties posed by the several demonstrated and contemplated difficulties of making plug tubesheets, a workable method of fabricating them was still sought.

OBJECTS OF THE INVENTION

The primary object of the invention is to provide a type of tubesheet which will permit leak-free hollow fiber battery cells to be more readily made and scaled up.

An ancillary object is to provide a practical—even automatable—process for constructing the scaled-up cells.

Another object is to provide a tubesheet of a shape such that it can be formed after the fiber bundle (etc.) has been rolled (or otherwise formed).

A further object is to provide a tubesheet of a shape such that a large temperature gradient, from the outer to the inner face of the tubesheet, conducive to attainment of graded porosity in "firing" can be established simply by subjecting only the outer end portion of it to direct heating (and allowing the rest of it to be heated by conduction).

An additional object is to provide a tubesheet configuration which can be more uniformly densified under a time/temperature firing protocol which is much less critical and does not require use of a vacuum oven.

A further—and very important—object is to provide a tubesheet configuration which can be attained with a slurry which does not include "spheres" or other relatively large, difficult-to-sinter particles.

It is also an object of the present invention to provide a method of tubesheet fabrication in which any broken fibers present in the "green" fiber/tubesheet assembly may be automatically closed off without recourse to post-firing treatments.

Another object is to make it possible to use tubesheet glasses of essentially the same composition as the fibers.

Yet another object is to provide a tubesheet configuration which permits the use of much smaller feedthroughs for effecting seals between the tubesheet and anode and cathode cups.

Still other objects will be made apparent to those knowledgeable in the art by the following specifications and claims.

SUMMARY OF THE INVENTION

It has been discovered that the foregoing objects can be attained if a hollow fiber (etc.) bundle is first formed with the free ends of the fibers unpotted and:
(1) the rheological and wetting properties of the slurry from which the tubesheet is to be formed and the size range of the particles in the slurry are such that
  a. the free fiber ends can be converted to a generally columnar, coherent bundle of coated fiber ends, i.e., to a dipped "brush", by an operation which comprises dipping them in the slurry,
  b. any excess of the slurry over the amount appropriate for the desired spacing between the fibers (i.e., the desired tubesheet diameter for a given number of fibers) can be removed from the dipped brush, and, preferably,
  c. the slurry will rise, by capillary action, within the lumens of the fibers (to a greater height in those fibers that may be broken, by reason of their no longer being closed ended);
(2) the free fiber ends are coated with said slurry, any excess of the slurry is removed and the brush of coated fiber ends is allowed or caused to assume whatever cross-sectional shape is desired for it,
(3) the resulting "green" plug-form tubesheet is allowed to dry—optionally, after being recoated as a whole with the same or a different but compatible slurry, to provide a more uniform or otherwise more desirable "skin".

The resulting article has utility in that it may, in a further step, be dried and heated, according to a preselected time/temperature protocol and in a manner such that the tubesheet is converted to an at least predominantly ceramified body.

Preferably, nothing is done to prevent entry of the slurry into the fibers and the process includes still another step to ensure that all competent fiber ends which have been potted in the slurry are open in the ceramified tubesheet. That is, a terminal portion of the outer end of the ceramified tubesheet/fiber composite is broken or cut off, the length of the removed portion being such as to include any tubesheet material which may be present in the lumens of the competent fibers but not such as to unplug any incompetent fibers. The "fired" assembly will then be helium-tight without further treatment.

DEFINITIONS OF TERMS

The term "ceramic" is defined for the purposes of this application in accordance with the broadest meaning given for the term in Webster's Unabridged Dictionary, 2d edition; i.e., products made from earth (sand, clay, metal oxides, etc.) by the agency of heat, such as glass, enamels and porcelain, for example.

As used herein, the term "generally columnar" refers to a body for which the ratio of its length to its average effective diameter is at least 2 or more and applies to elongate bodies which preferably have a regular, geometrical cross-sectional shape—most preferably circular—but may have irregularly shaped and/or non-constant cross-sections.

For convenience, the term fiber "bundle" as used herein denotes a plurality of spaced apart fiber lengths, whether "standing" alone or as an element of an assemblage including other elements, such as a cathode foil or an equivalent current distributing/collecting means, spacing tapes, etc., or whatever.

The term "dipped" as used herein is intended to denote any manner of causing the fiber ends to be immersed in a body of the slurry and then, while the fiber ends are vertically oriented, permitting or causing any portion of that body not taken up by the fiber ends to drain off or to be otherwise removed. The dipping operation preferably includes subjection of the slurry and/or fiber ends to vibration (to ensure more uniform emplacement or uptake of the slurry throughout the "brush" or fiber ends).

The term "capillary" is used herein as generic to hollow fibers and is used primarily in designating glasses of which hollow fibers are composed as "capillary glasses"—to avoid confusion with the established meaning of the term "fiber glass".

As used herein, the term "ceramified" applies to those portions of the fired tubesheet formed either by fusion or sintering of the particles from which they are derived.

The term "at least predominantly ceramified" was used above because it is not necessary for all of the tubesheet particles even to be sintered. The temperature profile along the central axis of the tubesheet during "firing" may be such that the particles subjacent to the "lower" or "inner" surface of the tubesheet remain unsintered; i.e., the lowermost portion of the finished tubesheet may retain the character of a dry but "green" body of the tubesheet particles. At the other extreme, however, the tubesheet particles can all be fused into a unitary, uniformly densified ceramic mass.

The term "helium tight" refers to a tubesheet in which the fused portion has an internal structure such that less than $10^{-9}$ c.c. per second of helium (measured at standard conditions) can diffuse through the tubesheet or along the fiber/tubesheet interfaces. It should be noted that the diffusion rate is an absolute rate and is not expressed in terms of helium volume diffused (per unit of time) per unit of area; the helium passes through only by way of leaks, at a rate independent of tubesheet diameter. (When the portions of the fibers depending from the tubesheet are closedended, the presence of any cracks, breaks or imperfect end closures may also be detected—as so-called "gross" leaks.)

The term "competent fiber ends" refers to the end portions of fibers which are unbroken and are (temporarily or permanently) closed at their other ends.

It has also been found that strong, not excessively strained, sleeve-type seals between the plug tubesheet and the anode (and cathode) cup feedthroughs can be effected if a good match is made not only between the coefficients of expansion of the seal and ceramified tubesheet materials, but also between their glass transition temperatures (Tg's).

When embodied as an unfired article, the invention may be defined as:

a bundle of spaced apart ceramic hollow fiber lengths having end portions gathered compactly together and potted in a generally columnar body of a coherent slurry of powdered ceramic material in a volatilizeable liquid, the average distance between adjacent said end portions being about ½ or less of the average distance between the ungathered portions of said fiber lengths and said slurry having rheological and wetting properties and the size range of the powder particles therein being such that:

(a) said body
 (1) could have been formed by an operation comprising dipping said fiber end portions in a quantity of said slurry and restricting the diameter of the resulting "dipped brush",
 (2) is convertible by drying and heating to a solid ceramic tubesheet through which said end portions of the fibers pass in sealing engagement therewith and which together with those end portions constitutes a composite structure.

In a preferred embodiment, the slurry has flowed by capillary attraction into any of the fiber end portions which were open, to a limited extent which is substantially greater for the end portions of any of the fibers which are incompetent and the foregoing article has been so converted to said composite structure. It is particularly preferred that the fiber "bundle" include a cathode foil, etc., and that the dependent fiber ends be closed.

A bonus of the plug tubesheet configuration is that a much closer and much more uniform spacing between the potted portions of the fibers are attainable than in disc-type tubesheets.

An additional bonus is that a type of leak experienced in disc-type tubesheet/fiber assemblies, i.e., so-called "doublet leaks", can be eliminated in plug tubesheets. That is, when two fibers are not separated by intervening tubesheet material in a disc-type tubesheet, the result is a leak path along the line of contact between them, from one face of the tubesheet to the other. The higher firing temperature which can be employed with plug tubesheets results in a sintering action between touching fibers which does effect a seal between them in at least the zone subjacent to the outer face the tubesheet will have after the end of it is removed. This may distort the cross-sections of the fibers involved but not to the extent of seriously restricting their lumens.

The larger particles in the slurries employed to make the disc-type tubesheets are essential to the slurry rheology required for operability of the prior art process for making them. However, elimination of these larger particles (which are generally spheroidal) is essential to close fiber packing in the plug tubesheet. Fortunately, this omission is more than just tolerable; it modifies the rheology of the slurry in a way essential to fabrication of plug form tubesheets. Further, it makes possible "automatic" plugging of the end portions of any incompetent fibers in the bundle; that is, the particles are small enough so that the slurry can flow by capillary "attraction" into any open-ended fiber portions during the dipping operation.

It has also been found that it is possible to make assemblies of fibers and plug-form tubesheets utilizing tubesheet materials having substantially higher glass transition temperatures than those which could be used in the prior art. This is an unanticipated consequence of being able to form the tubesheet from fine particles, i.e., from slurries which do not include the larger particles present in the prior art slurries.

The present invention is particularly suitable for use in hollow fiber type sodium/sulfur battery cells but is considered suitable for use in hollow fiber type, high temperature battery cells in general. It also would appear to offer advantages in the fabrication and operation of hollow fiber type, high temperature devices other than battery cells.

DETAILED DESCRIPTION

Tubesheet Length to Diameter Ratio

As indicated earlier herein, the plug form tubesheets of the present invention are generally columnar in shape and have length to average effective diameter ratios of at least 2. There is no inherent upper limit to the ratio but it will be appreciated that the higher the ratio the more carefully the tubesheet must be handled to avoid breaking it. Further, no advantage is apparent for ratios substantially in excess of about 10 to 1 and less efficient use of materials and cell space results as the ratio is increased. As a practical matter, ratios within the range of from about 3 to about 6 are highly preferred.

Suitable fiber, tubesheet and sealing materials for the practise of the present invention may all be generally categorized as "ceramics" (as defined earlier herein).

Other properties of the materials selected may vary according to the particularities of the specific use to be made of the contemplated device but in all cases relatively narrow requirements as to thermal and bonding properties must be met.

The tubesheet material must meet an additional requirement. That is, it must be processable into the form of a slurry which will have an adequately high solids content without being too viscous. As to thermal and bonding properties, the ceramic particles in the slurry must be convertible, by heating and cooling, to a substantially continuous, ceramic body which is sealingly engaged with the fibers passing through it and will bond with the sealing glass. The latter body (which may be all of or only an "upper" portion of the tubesheet) must adequately match both the fibers and the formed seal as to coefficients of expansion and also must have substantially the same glass transition temperature (Tg) as the formed seal. That is, as the seal and tubesheet bodies cool, they must reach their glass transition points at substantially the same temperature.

It is to be noted that the internal moisture content of the glass from which the tubesheet is to be made can substantially effect the Tg of that glass. Thus, a glass designated as "T-III" (composition given in Table I herein), when dried (by nitrogen purging during melting), has been found to have a 12° higher Tg than when it is not dried. Also, the Tg of the tubesheet glass can be altered by loss of any of its components which exert a significant vapor pressure when it is held in a molten state under less than autogenous pressure. For example, T-III glass slowly loses $HBO_2$ under the latter conditions and its Tg increases accordingly. Finally, the Tg of the completed tubesheet (or the fused portion thereof) will not necessarily be the same as that of the glass it was made from. That is, grinding, slurrying, drying and firing (sintering) T-III glass results in a Tg increase of some 15°. Thus, the actual Tg of a tubesheet made from T-III glass could be more than 27° higher than the value which might be determined on a specimen of the starting glass which had not been nitrogen-purged when it was cast and which had not been subjected to the tubesheet fabrication procedure.

A candidate sealing glass must possess certain properties in order to qualify for consideration as a cup-to-plug tubesheet seal glass. The first requirements are dictated by the seal environment. For example, in a sodium/sulfur battery cell the glass must have sufficient chemical resistance toward sodium, sulfur, and sodium polysulfide to maintain seal integrity and must be viscous enough at the 300° C. cell operating temperature to prohibit detrimental deformation; the seal glass transition temperature should be above 300° C. The nature of the seal establishes further glass property requirements. The seal glass must form two separate seals: a glass-metal seal with the anode cup and a glass-glass seal with the plug tubesheet. The seal glass must be fluid enough below the melting point of the cup metal (660° C. for aluminum) to be dippable.

The seal glass-to-tubesheet part of the seal places the most stringent property requirements of all upon the seal glass. This is discussed later herein but it may be noted here that glass-to-glass sleeve-type seals of plug tubesheet size, with unlike glasses, where the seals must maintain integrity through a temperature range from room temperature to 300° C., are extremely difficult to design and fabricate.

By reason of the effects on the tubesheet glass of the several tubesheet fabrication steps, the Tg of the seal-to-be can be as much as 15° C. lower than the Tg of the tubesheet, even though both are formed from the same batch of glass.

It has been found that a practical solution to the latter problem is to use a seal glass having a somewhat different composition from the tubesheet glass. In this way, satisfactory matches between both the Tg's and the linear coefficients of expansion of the seal and tubesheet can be reproducibly attained.

(It may be noted that a plug tubesheet—including the portions of the fibers potted in it—may readily be made in a size such that it can be utilized per se as a Tg test specimen (the expansion being measured along a diameter of the tubesheet).)

It has also been found possible to employ as the tubesheet glass one of the same composition as the hollow fibers, when the tubesheet is in the plug form and the slurry it is formed from consists essentially of particles with effective radii of curvature substantially less than that of the fiber lumens. As long as the particles of tubesheet glass make good contact at points and edges—where localized melting can occur before the fibers reach their softening temperatures—an adequately continuous tubesheet structure can be established without closing the fibers. However, the glasses found suitable for capillaries will generally not be useable as sealing glasses. They are not fluid enough below the melting point of aluminum to be dippable. A higher melting tank material could be used but the temperature to which the seal glass must be heated to effect a conforming seal with the tubesheet is so high that at least the outermost fibers would be closed.

On the other hand, the Tg of the seal glass must adequately match the Tg of the tubesheet glass; otherwise, cell lifetimes greater than about one to two weeks are rarely attainable. Thus, it is highly preferable to use a tubesheet (and seal) glass which has a lower Tg than the fiber glass.

When sealing the solder glass to the tubesheet, the temperature is raised until the seal glass softens enough to deform to the tubesheet. For example, for the T-III glass, a sealing temperature of 495° C. for 15 minutes is required (the sealing temperature is time-dependent). If the Tg of the seal glass is less than that of the tubesheet glass, the (softer) seal glass conforms, as the seal is cooled, to the dimensional change of the harder tubesheet glass. Eventually, the seal glass reaches a temperature where it sets up, i.e., will no longer conform to the cooling tubesheet glass without developing internal stresses. This is called the seal set point, and occurs at a seal glass temperature between the anneal point and the glass transition temperature. During further cooling, the seal glass will have a substantially higher coefficient of expansion than the tubesheet glass (which is already below its Tg). Consequently, the tubesheet/seal composite will be stressed to an undesirable extent. This stress, which cannot be avoided by resort to slower cooling, will persist under the conditions of use normally encountered in high temperature battery cells. An intolerable degree of stressing can only be avoided by an adequate match between the Tg's of the seal and tubesheet glasses.

Suitably, the Tg's of the seal and tubesheet glasses do not differ by more than about 5° C. and their linear coefficients of expansion do not differ by more than about $10 \times 10^{-7}/°C$.

In practice, all glass seals have some internal stress at their operating temperature. A good seal is one that functions properly under design operating conditions. For most seals, this means the seal stress should be less than 1500 psi to prevent cracking.

The sealing procedure includes dipping the end of the feed—through portion of the tank into the molten seal glass, removing it and letting the adhered glass "collar" cool. This of course requires that the molten glass be adequately able to wet the tank material (aluminum, for example). Since it usually will not be possible to have a close match between the coefficients of expansion of the seal and tank materials, it will generally be necessary for the portion of the tank in contact with the seal glass to be relatively thin (5 mils, for example) to avoid intolerable stressing of the glass when the cell is at operating temperature. (See FIG. 2B.)

Ceramic materials generally suitable for use as fibers and tubesheets in the practice of the present invention include those disclosed in the U.S. patents cited previously. Among the latter, the '602, '331, '995 and '386 patents are the most informative as to fiber glass compositions and the '490, '613, '386 and '742 patents are the most informative as to tubesheet compositions. For fabrication of high temperature battery cells employing anode and/or cathode materials other than sodium and/or sulfur or of devices other than battery cells, other ceramic materials may also be suitable.

Specific compositions are given subsequently herein for various combinations of capillary, tubesheet and seal glasses which resulted in helium leak tight fiber/tubesheet/anode tank assemblies. Lifetime data is also given for complete cells including most of the latter assemblies.

Discussion of compositional effects in more detail is deferred until after the following discussion of fabrication procedures.

Fabrication of Fiber/Tubesheet Assemblies

Figure 1:
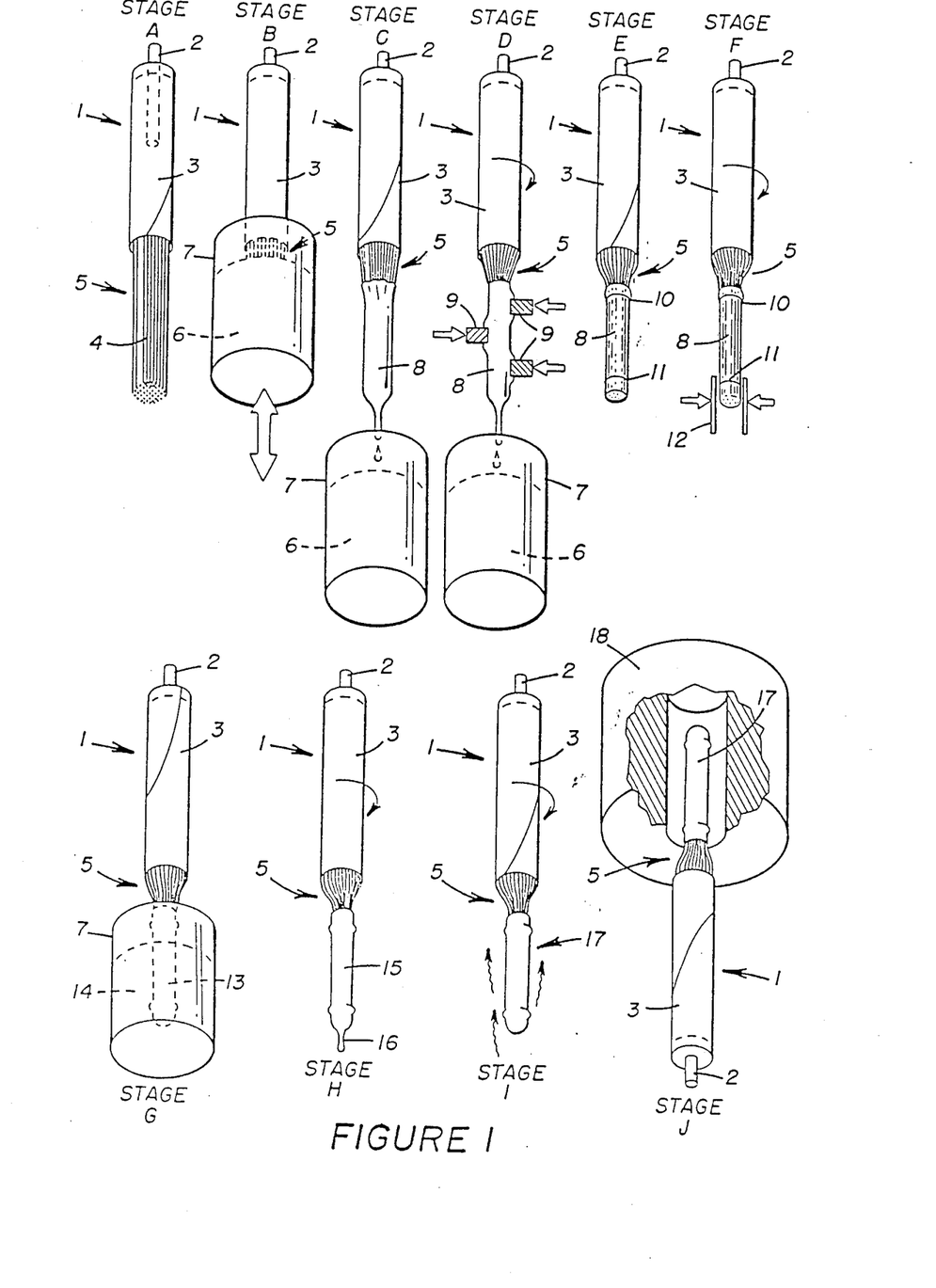
FIG. 1 depicts, in vertical perspective, the successive stages in the preferred mode of fabricating a hollow fiber (etc.)/tubesheet assembly of the present invention by the method of the present invention.

Referring to FIG. 1 of the drawings, in stage A there has been formed and positioned as shown a rolled-up assembly (1) of a central, aluminum tubing mandrel (2), an aluminum foil cathode current collector/distributor (3), of which only the outermost wrap is visible, a plurality of parallel hollow fibers (4), an aluminum spacer-tape (not shown; see element number 32 in FIGS. 2 and 2A) and two, thin, aluminum positioning tapes (not shown; see elements number 35 in FIGS. 2 and 2A) coated with a thermally degradeable adhesive. Reference may be had to the above-cited '868 patent for details of the rolling procedure (except for the use of relatively longer fiber lengths and the omission of the tubesheet material in the assembly at point).

Only the upper end of the mandrel is depicted in stages B through J.

In stage B, the "brush" (5; step A), consisting of the exposed portions of the fibers (4) (which are closed at their upper ends and open at their lower ends) has been partially dipped into a slurry (6) in a liquid such as cumene of a tubesheet glass which has been finely ground with a grinding aid such as hexadecyl amine. The slurry is contained in a cup (7) which has been raised up to accomplish the dipping.

In stage C, cup (6) has been lowered to allow some of the excess slurry to run and drip off of the brush (5), which now includes slurry which has been carried into it by a "wicking" action and is coated with a surrounding layer (8) of the slurry.

In stage D, the assembly (1) is rotated (by means not shown) about its vertical axis while three "shoes" (9) are pressed lightly inwardly against the coated brush and horizontally vibrated (by means described subsequently herein) to reduce the effective diameter of the brush, ensure complete and uniform penetration of the brush by the slurry and to facilitate draining off of the remaining excess slurry.

In stage E, the coating (8) has now been substantially reduced in thickness and two encircling ties (10; cotton thread) and (11; fine aluminum wire) have been emplaced on the coated brush. The aluminum tie has been emplaced by looping it around the brush just below the cotton tie, then working it down, to squeeze out and push down a little more of the slurry, and then tightened gently. (Ordinarily, the aluminum tie is included in the portion of the tubesheet removed after "firing".)

In stage F, the coated brush has been rotated about its central axis and aligned, as necessary, by means of a prepositioned means such as one's finger or a TEFLON ®* cylinder (12; indicated diagramatically), , to improve the concentricity of the fiber layers.

*Trademark of E. I. duPont deNemours and Company

In stage G, the slurry-impregnated and -coated portion (13) of the brush (5) has been allowed to dry until somewhat stiffened and then immersed (dipped) in a slurry (14) of which the composition is the same as or different from that of slurry (6).

In stage H, the slurry has been removed from contact with the assembly, which has then been subjected to several brief periods of rotation to help the excess of slurry (14) drain off and to better smooth the newly formed outer layer (15). If a slurry "tail" (16) is present, it may be readily cut off, as with scissors.

In stage I, the assembly is being rotated in a forced air flow (from a fan) to induce drying (evaporation of the liquid component of the slurry). At this stage, the resulting "green" tubesheet (17) preferably is baked in vacuo (as described later herein) to complete removal of the liquid slurry medium and to remove as much of the grinding aid as possible, before stage J is reached.

In stage J, the assembly has been inverted and positioned with the green tubesheet (17) within a metal heating block (18; heat supply and temperature control means not shown) for sintering of the tubesheet.

The vibration and "squeezing" action of the "shoes" used in stage I of the foregoing procedure may be provided by any suitable means. A preferred such means is that which has been employed in actual practice. That is, an ordinary 3-fingered laboratory clamp is slidably mounted on a vertical rod and has been modified in four respects; the "thumb screws" have been removed, the spring which normally urges the clamp arms apart has been removed, a D.C. relay has been fastened to each arm and a grooved plastic block (a "shoe") has been drilled and slipped onto each of the three fingers (and secured thereon by means of set screws).

The resultant "vibrator/aligner/squeezer is not part of the present invention and was devised by a coworker of the present inventors. The clamp arms, one having a shoe mounted on its single "finger" and the other having a shoe on each of its two fingers, are moved towards or away from the slurry-impregnated fiber brush by hand. The nominally D.C. relays are caused to "chatter" by applying about 45 volts of A.C. across their coils (no use is made of the relay "points").

Slurry Composition and Preparation

The composition and preparation of the slurry is generally according to the disclosure of the above cited U.S. Pat. No. 3,917,490. See also U.S. Pat. Nos. 4,219,613 and 4,403,742, likewise cited above. However, a major departure is made in that the larger (spherical) glass particles employed in the prior art slurries are not included in the slurries used to make plug tubesheets according to the present invention. This alters the rheology of the slurry and necessitates modifications in other process parameters.

The liquidity of the slurry is a function of not only the liquid medium content (weight ratio of cumene, for example, to solids) but also the relative amount of the grinding aid (hexadecylamine, for example) employed in production of the powdered tubesheet glass and of the surface moisture content of the powder particles. It is also a function of the proportion of $Na_2O$ in the glass; the T-III glass is relatively low in $Na_2O$ and more cumene must be used with it to achieve an adequate degree of slurry fluidity. This in turn increases a tendency for elongated cracks to form in the cylindrical surface of the ceramified tubesheet. Fortunately, however, it is possible to hold down the cumene to solids ratio, without sacrificing workability of the slurry, by allowing the glass powder to take up a little surface moisture before it is slurried, as by 1 to 2 hours exposure to "dry" room air having a relative humidity of about 3 to 4.5%.

In order to achieve solids contents high enough so that a large proportion of the tubesheets will be helium leak-tight, it has been found desirable to limit mill size during the grinding operation. With a 7.5 Kg batch of T-III glass ground in a 1.5 gallon (5.68 liters) mullite milling jar with 6 Kg of $20 \times 20$ mm $\alpha Al_2O_3$ cylinders ("balls") the maximum solids/cumene ration achievable (for appropriate slurry rheology) was 3/1 and only a low proportion of helium-tight tubesheets could be made. 0.15 Kg batches ground in a 1 quart (0.95 liter) jar with 1.2 Kg of $12 \times 12$ mm cylinders were converted to fines with which a 5/1 ratio could be attained before the slurry viscosity became too high; the higher ratio resulted in a large proportion of helium-tight tubesheets.

Experiments were carried out with T-III glass ground in the small mill. In these experiments, the effect on helium tightness of the amount of grinding aid used and the solids to cumene ratio were assessed. The results indicated that the % of grinding aid used (grams per 100 grams of the glass) could range from about 0.75 to about 1.50 and the solids to cumene ratio from about 4.0 to about 5.5 to 1, depending on the amount of the grinding aid used. Good results have consistently been attained by preparing plug tubesheets from T-III glass ground with about 1% hexadecylamine ("HDAM") and employed in a solids to cumene ratio of from about 4.5 to about 5.4 to 1. (Poor results were experienced at a solids to eumene ratio of 5.5 to 1 when only 0.75% of HDAM was used.)

In any case, at least enough of the HDAM should be used to provide a monomolecular layer of it on each of the powder particles. Usually, more will be desirable.

The relative amount of HDAM required to adequately grind the T-III glass, which is relatively soft, is substantially greater than for harder glasses (capillary glass, for example). It is difficult to effect a high degree of removal of HDAM from the soft (borate) glasses and this apparently is responsible for the bubbles which have been found (by use of a scanning electron microscope) in diamond cut cross-sections of fired tubesheets. The bubbles are not connected and do not provide leak paths, but some expansion can result from their formation (during "bake-out", as discussed later herein).

Another aspect of glass composition is excessive moisture content. If the glass is subject to "weathering" by moisture or if moisture uptake undesirably alters the performance of the glass as a component of the slurry and/or tubesheet, the glass must be worked with in an environment of controlled moisture content. Cesia-containing glasses, for example, were found to weather badly in the reduced humidity atmosphere in a so-called "dry room" and had to be worked with in a glove box under dried nitrogen. On the other hand, as discussed above, a certain minimal content of moisture in the particles of tubesheet (or seal) glass may be essential to attainment of the desired slurry rheology, at least for some glasses.

Dry compositions and thermal properties are given in Table 1 for a number of representative glasses which have been used as fibers, tubesheets and seals in fiber/tubesheet assemblies and cells.

The most preferred glasses for use as seal and/or tubesheet glasses are the ternary glasses, T-I, II, III and IV listed in the Table. See also Example 6 herein and the discussion following it.

The tubesheet and seal preferably consist essentially of $Na_2O/B_2O_3/SiO_2$ glasses in which the $B_2O_3$ to $Na_2O$ mole ratios are within the range from about 9 to about 24 to 1. It is particularly preferred that the $B_2O_3$ to $SiO_2$ mole ratio in the tubesheet glass be about equal to the $B_2O_3$ to $SiO_2$ ratio in the seal glass.

In the more preferred protocol both amine removal and glue decomposition are achieved prior to sintering. The dried tubesheet/fiber (etc.) bundle assembly is heated as a whole, and in vacuo, to a temperature within the range of from about 240° to about 260° C. and held in that range for about 2 hours. The assembly is then

TABLE I

CAPILLARY, TUBESHEET AND SEAL GLASSES

| Glass Designation | Wt. % Composition/Mole Ratio | | | | | | Nominal[1] Glass Trans. Temp. | Thermal Coef. of Expansion in Linear Range: (α) | Used as |
|---|---|---|---|---|---|---|---|---|---|
| | $Na_2O$ | $Cs_2O$ | $B_2O_3$ | $SiO_2$ | NaCl | NaF (or) | | | |
| Hard Cesia-1 | 3.1 / 1.0 | 42.0 / 3.0 | 53.1 / 15.2 | 1.9 / 0.6 | — | — | 380° C. | $116 \times 10^{-7}$/°C. | Tubesheet |
| Hard Cesia-2 | | 1.0 | 2.9 | 14.3 | 0.6 | | | | Tubesheet |
| Soft Cesia | 2.6 / 1.0 | 35.4 / 3.0 | 59.7 / 20.4 | 2.2 / 0.9 | — | — | 355 | 116 | Tubesheet |
| D-406 | 27.85 / 1.0 | — | 62.56 / 2.00 | 5.40 / 0.20 | 4.20 / 0.16 | — | 480 | 116 | Tubesheet & Capillaries |
| T-I | 3.5 / 1.0 | — | 93.7 / 23.8 | 2.8 / 0.8 | — | — | 285 | 106 | Tubesheet & Seal |
| T-II | 4.5 / 1.0 | — | 92.7 / 18.2 | 2.7 / 0.6 | — | — | 305 | 105 | Seal |
| T-III | 6.5 / 1.0 | — | 90.8 / 12.4 | 2.7 / 0.4 | — | — | 328 | 103 | Tubesheet & Seal |
| T-IV | 8.8 / 1.0 | — | 88.6 / 9.0 | 2.6 / 0.3 | — | — | 342 | 102 | Tubesheet & Seal |
| AC1 | 2.4 / 1.0 | — | 89.9 / 33.4 | 2.3 / 1.0 | — | 5.4 / 3.3 | — | — | Seal |
| AC2 | 3.4 / 1.0 | — | 91.2 / 23.9 | 2.7 / 0.8 | — | 2.8 / 1.2 | — | — | Seal |
| CZN | 1.0 | — | 0.6 | 0.5 | — | 0.6 | $Al_2O_3$ 450 | 135 | Capillaries |
| DKY | 1.0 | — | 0.9 | 1.0 | — | 0.3 | $Al_2O_3$ 465 | 125 | Capillaries |

Note:
[1] As determined on cast and annealed sample of the glass. Not the same as the Tg of a finished tubesheet, seal or capillary.

Bake-out and Sintering Operations

Removal (decomposition) of the glue on the spacing and positioning tapes in the fiber bundle requires higher temperatures than does removal of the hexadecyl (or other such) amine from the tubesheet but sintering can be accomplished at temperatures below those required for the glue oxidation. Accordingly, either of two different bake out/sintering protocols may be employed.

In both protocols sintering is done in an aluminum heating block while exposed to room air (ambient temperature 20°-24° C., relative humidity 3-4.5%) at atmospheric pressure.

In the less preferred protocol, the tubesheet is first dried by heating it, at a rate of 300° C./hour, to 100°±5° C. and holding it at temperature for 0.5 hour. It is then largely freed of the amine by heating it, at a rate of 600° C./hour, to 350°±3° C. and holding temperature for 0.75 hour. The actual sintering is accomplished by next heating the tubesheet, at a rate of 400° C./hour, to 470°±1° C. and "soaked" at temperature for 1 hour. Cooling follows, at a rate 300° C./hour or less. The fiber/foil bundle is then placed in a heater block in vacuo and heated to a temperature within the range of from about 240° to about 260° C. and held there for about 2 hours.

cooled and the tubesheet heated at 350° and sintered at 470° C., as in the preceding protocol.

It has been found that "foaming", apparently due to formation of bubbles of residual amine, occurs during sintering (and/or post-sintering heating steps such as bake-out or sealing) in tubesheets densified according to the first protocol. This can result in as much as a 9% expansion in the tubesheet volume. However, tubesheets densified in the manner of the second protocol undergo contraction, rather than expansion. This contraction may be sufficient to cause longitudinal tension cracking in the "fired" tubesheet surface when the cumene content of the slurry is relatively high, but otherwise is preferable.

Both protocols are advantageous in comparison to that employed for disc-type tubesheets, in which the use of a vacuum oven with very close temperature control is required.

Figures 2, 2A, 2B:
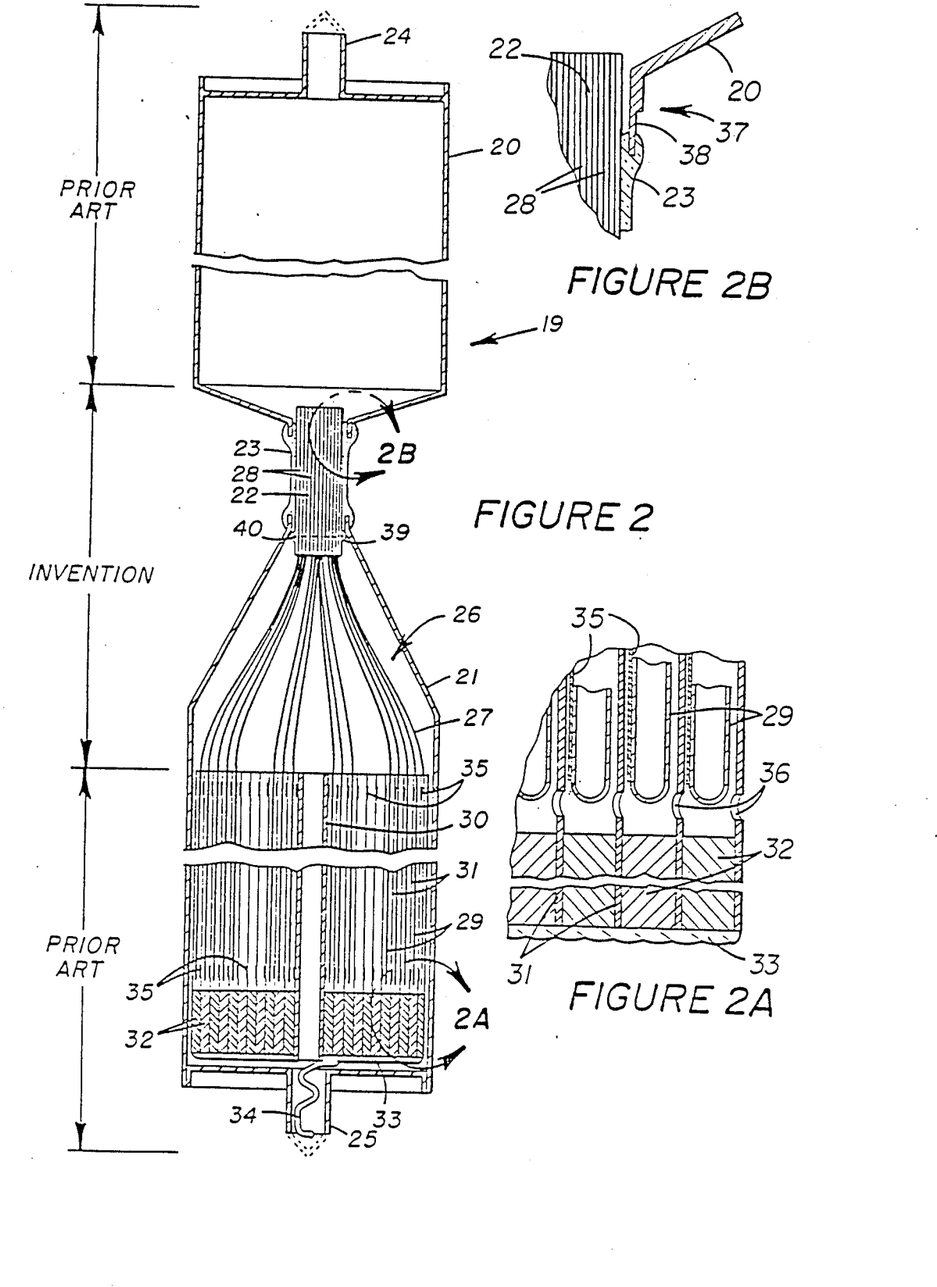
FIG. 2 depicts, in vertical cross-section, a "two-compartment sodium/sulfur battery cell in which is incorporated a hollow fiber/tubesheet assembly of the present invention. The portions of the cell which are according to the prior art so identified. Enlarged views of the encircled portions of FIG. 2 are given in FIGS. 2A and 2B.

To facilitate understanding of how the sintered tubesheet is incorporated in the cell, reference in now made to FIG. 2 of the drawings, in which a "two compartment", plug tubesheet cell (sans electrochemical reactants) is depicted. The portions of the cell which are according to the prior art are so identified in the Figure (although the cell in its entirety is novel as a combination of old and new elements. The cell (indicated generally by the number 19) comprises an aluminum anode (or anolyte) tank (20), a cathode (or catholyte) tank (21), a plug tubesheet (22) with which tanks (20) and (21) are sealingly engaged by a body (23) of seal glass. Tanks (20) and (21) include preformed fill spouts ("ports") (24 and 25, respectively) which are open but would be closed, as indicated in phantom, after the tanks have been filled with the anolyte and catholyte. Tank (21) contains an inner assembly (indicated generally by the number 26) which includes a large number of hollow glass fibers (27), of which only a few are shown. The fibers have upper end-portion (28)—which extend through and are "potted" in the tubesheet (22)—and have lower portions (29) which are closed-ended. The assembly (26) also includes a central, aluminum mandrel (30) about which it was rolled up, wraps (31) of a foil-form, aluminum cathodic current collector/distributor, wraps (32) of an aluminum spacing tape—the thickness of which is greater than the diameter of the fibers. Several, radially disposed heli-arc weld beads (33; only one shown) are formed on the bottom of the roll to ensure good electrical contact between the foil and tape wraps and an aluminum tail (34) is joined to the roll bottom by one of weld beads (33). The tail will be straightened and joined at its lower end in the body of metal formed when the spout (25) is closed—as by crimping and/or welding. (Spouts (24) and (25) will also function as electrical terminal posts in the complete cell.) The inner assembly further includes wraps (35) of two thin aluminum tapes to which the fibers were adhered by a layer of adhesive when the roll was formed, in order to maintain a preselected distance between adjacent fibers. (The adhesive has been thermally decomposed and removed.)

FIG. 2A is a magnified depiction of the encricled portion of the inner assembly (26). It will be seen that the wraps (31) of the current collecting/distributing foil are pierced by openings (36) to facilitate catholyte introduction between adjacent fibers and between successive fiber/foil wraps.

FIG. 2B is a magnified depiction of the encircled portion of the tubesheet to anode tank seal. The lower end of the anode tank (20) is a collar-shaped "feed-through" (indicated generally by the number 37), which includes a lowermost section (38) which has been machined to a reduced thickness (5 mils, for example) and pre-engaged with the glass from which seal (23) was later formed (as described subsequently herein).

The bulge (39) at the lower end of the tubesheet in FIG. 2 results from the presence of the cotton tie (40) which was introduced (as element 10) in stage E, FIG. 1.

Figure 3:
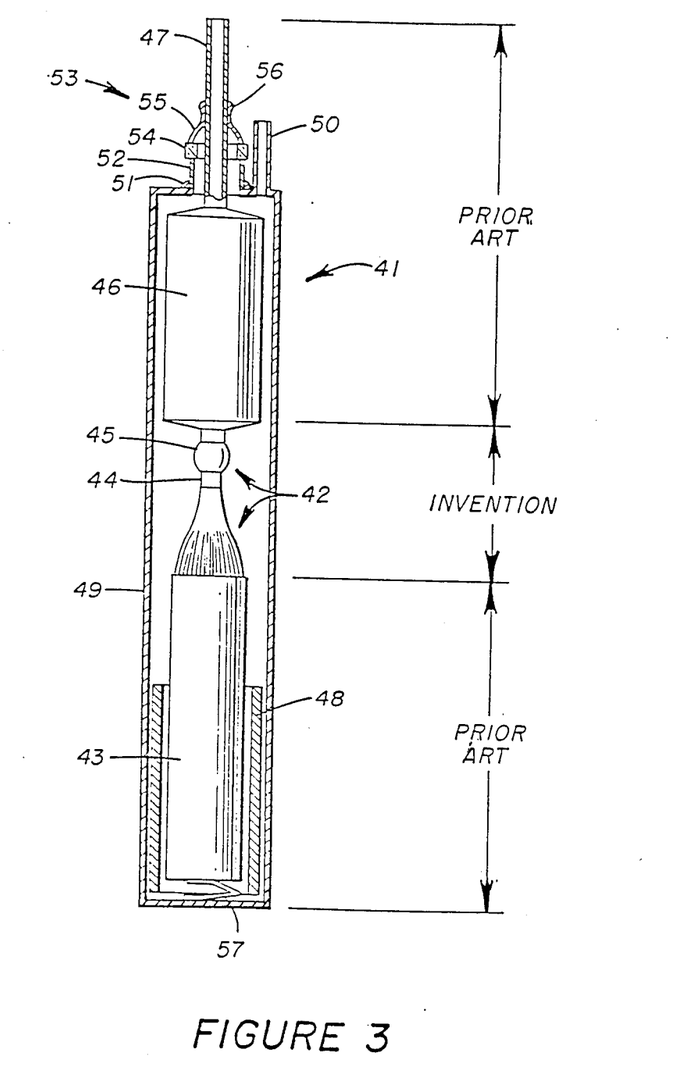
FIG. 3 depicts a "one-compartment" sodium/sulfur battery cell in which is incorporated a hollow fiber/tubesheet assembly of the present invention. The outer casing is seen, in vertical cross-section, after being cut away to expose, intact, the rest of the cell elements to view. The portions of the cell which are at least generally according to the prior art so identified.

Referring to FIG. 3, the depicted "one compartment" cell (indicated generally by the number 41) differs from the two-compartment cell of FIG. 2 in several respects. The cell comprises an inner assembly (42) consisting of a foil-wrapped fiber bundle (43), a plug tubesheet (44), a glass seal (45) and an anolyte tank (46) which is extended by an anolyte fill spout (47) which also functions as the negative terminal of the cell. The inner assembly is disposed, together with a cylindrical, stainless steel spacer (48), in a stainless steel casing (49) which includes a catholyte fill spout (5) and is sealingly engaged by a weld bead (51) with the bottom rim of a lower, cylindrical, metallic portion (52) of a pre-fabricated, insulator/seal (indicated generally by number 53). The upper rim of element (52) is sealingly engaged with an annular, hard glass insulator (54) which also is sealingly engaged with the lower rim of a bell-shaped, metallic extension (55). The upper end of the latter "bell" is sealingly engaged with the periphery of spout (47) by an encircling weld bead (56). The metal portions (52) and (55) of the insulator/seal (53) consist of KOVAR, a well-known alloy of iron, nickel and cobalt. Insulating seals of the latter type are made and sold by Larson Electronic Glass Co., Redwood City, Calif., U.S.A. An electrical connection between the bottom of element (43) and the casing (49) is provided by a limp length (57) of a heavy gauge aluminum foil through end welds (not shown).

The lower portion (not separately numbered) of casing (49) functions as the catholyte container.

Tubesheet-to-Tank Seals

The seal between the tubesheet and the anode tank is made by: (1) dipping the machined portion of the tank feed-through (see FIG. 2B of the drawings) in the molten seal glass, (2) withdrawing it while exerting sufficient gas pressure inside the tank so that the adhered glass will depend from the feed-through in the form of an open-ended cylinder or collar, (3) allowing the collar to solidify, (4) inserting the plug tubesheet within the collar, (5) heating the collar (and tubesheet) until the collar melts and contracts annularly against the tubesheet surface, and (6) allowing the assembly to cool slowly.

If seals are to be effected to both the anode and cathode tanks (as in FIG. 2 of the drawings), the procedure is generally the same. However, the foil wrapped fiber bundle and the tubesheet must be positioned in the (open bottomed) cathode tank and pre-glassed feed-through, respectively, before the anode tank feed-through is slipped down around the then protruding tubesheet. Also, the bottom of the cathode tank preferably is not welded on until after both seals have been effected (simultaneously). As shown in FIG. 2, the sealing glass may constitute a single body of glass when the sealing operation has been completed.

In greater detail, the preceding step (5) is carried out by resort to either induction or simple resistive/conductive heating—the latter being considerably preferred.

In the inductive heating method, the tubesheet and bundle assembly and the dipped anode tank feed-through are positioned within a pyrex tube, together with a carbon ring, having the form of a short cylinder, and a VYCOR supporting/spacing tube. The carbon ring rests on the latter tube and surrounds the dipped feed-through. The entire tube and its contents are preheated in a heater block to about 400° C., under an inert atmosphere, and then lowered through an induction coil until the carbon ring is within the coil. The coil is energized, thereby heating the ring to a red glow, the ring in turn heating the seal glass by irradiation.

In the preferred heating method (as applied in fabrication of a one-compartment cell), the entire anode tank is positioned between the two halves of a "split" nickel sleeve which is shaped to support the tank without hindering insertion of the tubesheet in the dipped feed-through. The nickel cylinder is slid into a closely fitting, thick-walled, copper cylinder around which an electrical heating band and an outer layer of thermal insulation are disposed. The tubesheet/fiber (etc.) assembly is positioned by a centering jig and raised by a height-adjustable means, such as a laboratory jack, until the tubesheet is properly positioned within the glass-dipped feedthrough. The heating band is turned on and the seal glass collar brought to a preselected temperature and held there for a preselected period—which is temperature dependent. (For T-III seal glass, 15 minutes at 495° C. has been found suitable.) The heat is then turned off and the entire apparatus allowed to cool slowly. The split sleeve and the anode tank/tubesheet/fiber (etc.) assembly are lifted out and separated.

EXAMPLES

The following examples are for purposes of illustration and are not bo be construed as limiting the present invention in a manner inconsistent with the claims in this patent.

Example 1

A slurry of 4.8 grams of cumene and 30 grams of powdered "hard cesia-1 glass" (see Table I), which had been ground with hexadecylamine in the manner of U.S. Pat. No. 3,917,490, was made up, vacuum deaerated, bottled and placed in an "ultrasonic bath". 3800 Hollow glass fibers (D-406 glass, Table I), each having a length of 6 inches (15.24 cm), an O.D. of 80 microns, an I.D. of 50 microns and being closed at one end, were laid down in ladder fashion on properly spaced, "spacing" and "positioning" aluminum foil tapes (FIG. 2) coated with rubber cement (by solvent evaporation). The number of fibers per cm of the ladder length was 20. A 1.9 meters long section of the ladder was rolled up with the coated tapes and a 4.5" (11.43 cm) wide, 12.7 microns (5 mil) thick, air-baked, molybdenum-coated aluminum foil strip about 2 meters long. The thickness of the spacing tape was such that the successive wraps of the latter foil were 127 microns (5.0 mils) apart. The open-ended "bending section" of the resultant fiber bundle, 2.5" (6.35 cm) long, was slowly (5 minutes) lowered into the slurry—which was still being subjected to ultrasonic vibration—to a depth of about 1.25" (3.18 cm) and held there for about 60 seconds. The resulting "dipped brush" was then withdrawn and "milked" of excess slurry. One cotton and one aluminum tie were applied (see FIG. 1, stage E) and the constricted bundle end redipped in the slurry. The resulting nascent tubesheet was slowly dried and then inserted to a depth of 1" (2.54 cm) in a ½" diameter (surface darkened) well of an aluminum heating block, without touching the wall. The block was then heated as follows: 0.5 hour at 100° C., 0.5 hour at 400° C. and then 1 hour at 505° C. After being allowed to cool slowly, the "fired" tubesheet was shortened (to ensure that all fibers were open) using a pair of side-cutting pliers to snap off a 0.25" (0.64 cm) end piece (including the aluminum tie). The resulting tubesheet/fibers (etc.) assembly was tested and found to be helium-tight (as defined earlier herein).

Example 2

A smaller (500 fiber) plug tubesheet/fiber (etc.) assembly made in the manner of Example 1 but using a "soft cesia" glass (Table I) as the tubesheet material was made, found to be helium-tight and incorporated in a complete, one-compartment cell, using the T-I "ternary" glass for the anode tank to tubesheet seal. The cell was charged with sodium and sulfur and was satisfactorily charge/discharge cycled for 8 weeks (at about 300° C.).

EXAMPLE 3

Before the niceties of matching the Tg's of the tubesheet and seal were appreciated, fifteen helium-tight, two-compartment, plug tubesheet cells were fabricated with tubesheets made of capillary glass (D-406) and induction-heated seals made of either T-I or AC1 glass. Of the eight cells in which the seals were made of T-I glass, two lasted 6 days when charged with sodium and sulfur and cycled at ~300° C. a total of 14 times; none of the other five lasted more than two days. Of the seven cells in which the seals were made with AC1 glass, two lasted 4 days (10, 11 cycles) and the rest lasted 3 days or less.

EXAMPLE 4

Some improvement over the results in Example 3 was experienced when a number of one-compartment cells were made using D-406 fibers, D-406 tubesheets and T-III seals, but only a few cells lasted longer than 6 days, i.e., up to 13 days (11 cycles), even though all cells were helium-tight when put on test.

Two one-compartment cells having nominal capacities of 12 ampere hours were fabricated with D-406 fibers, T-III tubesheets and T-IV seals. One lasted only 8 days (10 cycles) but the other lasted 31 days (42 cycles). (In both cells, the molybdenum-coated aluminum cathode foil had been air-baked to form a surface layer of molybdenum oxides.)

EXAMPLE 5

A total of 26 one-compartment, helium-tight, plug tubesheet cells (12 ampere hours nominal capacity) were fabricated. In each of these cells, the fibers consisted of D-406 glass and the tubesheet and seal were made of the same ternary glass (T-III). In eight of these cells, the molybdenum-coated, aluminum cathode foils had not been air-baked. In the other 18 cells, the foil had been air-baked (air-baking is the subject of a separate patent application, Ser. No. 494,595 filed May 13, 1983 and now allowed). The tubesheet glass used in half of the latter 18 cells had been nitrogen purged. This was not true of the glass used in any of the other cells in either group. The lifetimes of these 26 cells at 300° C. are given in the following Table II.

The variation in lifetime shown by nominally identical cells under nominally identical conditions is illustrative of the inherent difficulties of reproducibly fabricating hollow fiber cells by current techniques. However, the benefits of using closely matching seal and tubesheet glasses and the mismatching resulting from nitrogen purging of only one of the supposedly matched glasses is nevertheless apparent from the data in the Table.

TABLE II

LIFETIHES OF CELLS IN WHICH T-III GLASS USED IN BOTH TUBESHEET AND SEAL

| Cell No. | Foil Air Baked? | Lifetime Days | Cycles | Comments |
|---|---|---|---|---|
| PA 4 | No | 31 | 38 | |
| PA 5 | " | 4 | 10 | Low sodium found. |
| PA 6 | " | 12 | 9 | Open circuit after cycle 8. Low Na. |
| PA 9 | " | 37 | 8 | Open circuit after cycle 8. Low Na. |
| PA 10 | " | 21 | 20 | |
| PA 20 | " | 48 | 39 | |
| PA 29 | " | 78 | 44 | |
| PA 30 | " | 12 | 14 | |
| PA 47 | Yes | 159 | 214 | |
| PA 48 | " | 23 | 214 | |
| PA 51 | " | 13 | 12 | |
| PA 53 | " | 18 | 20 | |
| PA 113 | " | 128 | 189 | Low Na. Cycled at 5 amp. hr. |

TABLE II-continued
LIFETIMES OF CELLS IN WHICH T-III GLASS USED IN BOTH TUBESHEET AND SEAL

| Cell No. | Foil Air Baked? | Lifetime Days | Cycles | Comments |
|---|---|---|---|---|
| PA 182 | " | 100 | 126 | |
| PA 183 | " | 3 | 4 | |
| PA 185 | " | 125 | 116 | Cell heater failed. |
| PA 187 | " | 1 | 2 | |
| PA 118 | " | 3 | 3 | Tubesheet glass $N_2$-purged. |
| PA 120 | " | 40 | 28 | Tubesheet glass $N_2$-purged. |
| PA 129 | " | 1 | 1 | Tubesheet glass $N_2$-purged. |
| PA 130 | " | 0 | 0 | Tubesheet glass $N_2$-purged. |
| PA 132 | " | 4 | 2 | Tubesheet glass $N_2$-purged. |
| PA 133 | " | 5 | 4 | Tubesheet glass $N_2$-purged. |
| PA 137 | " | 1 | 1 | Tubesheet glass $N_2$-purged. |
| PA 138 | " | 1 | 1 | Tubesheet glass $N_2$-purged. |
| PA 142 | " | 1 | 1 | Tubesheet glass $N_2$-purged. |

EXAMPLE 6

One 6 ampere hour and two 12 ampere hour one-compartment cells which here relatively long lived were fabricated with D-406 fibers and with the tubesheet and seal glasses given in Table III following:

TABLE III
LONGER LIVED CELLS WITH "TERNARY" TUBESHEET & SEAL GLASSES

| Cell No. | Amp. Hr. Rating | GLASSES Tubesheet | Seal | LIFETIMES Days | Cycles |
|---|---|---|---|---|---|
| PA 279 | 6 | T-I | T-II | 196 | 252 |
| PA 214 | 12 | T-III | T-IV | 205 | 107 |
| PA 34 | 12 | T-I | T-III | 252 | 116 |

Table IV, following, includes the Tg and α values and the compositions (from Table I) for the tubesheet and seal glasses used in cells PA 47, PA 113 and PA 185 (Table II) and in cells PA 279, PA 214 and PB 34 (Table III). Also given in Table IV are the $B_2O_3/SiO_2$ mole ratios for each tubesheet and seal glass. For each cell, the ratio of the latter ratios is also shown.

TABLE IV
GLASS MATCHES IN LONGER LIVED PLUG TUBESHEET CELLS

| Cell No. | Tubesheet Glass $B_2O_3/SiO_2$ | $Tg^1$ | $\alpha^1$ | Seal Glass $B_2O_3/SiO_2$ | $Tg^1$ | $\alpha^1$ | Ratio of Ratios | Lifetime in Days |
|---|---|---|---|---|---|---|---|---|
| PA 47 | 12.4/0.4 = 31 | 328 | $103^2$ | Same as for tubesheet | | | 1 | 159 |
| PA 113 | 12.4/0.4 = 31 | 328 | $103^2$ | Same as for tubesheet | | | 1 | 128 |
| PA 185 | 12.4/0.4 = 31 | 328 | $103^2$ | Same as for tubesheet | | | 1 | 125 |
| PA 279 | 23.8/0.8 = 30* | 285 | 106 | 18.2/0.6 = 30 | 305 | 105 | $1.0^3$ | 196 |
| PA 214 | 12.4/0.4 = 31 | 328 | 103 | 9.0/0.3 = 30 | 342 | 102 | 1.0 | 205 |
| PB 34 | 23.8/0.8 = 30 | 285 | 106 | 12.44/0.43 = 31 | 328 | 103 | 1.0 | 252 |

NOTES:
[1] Nominal for glass, not necessarily same for tubesheet or seal per se.
[2] $\times 10^{-7}/°C$.
[3] $29.8/30.3 [= 0.98] = 1.0$
*$23.8/0.8 [= 29.8] = 30$.

It is apparent from the foregoing examples that longer cell lives can be achieved when the compositions of the tubesheet and seal glasses match closely. For cells in which both the tubesheet and seal glasses are ternary (sodium borosilicate) glasses, the longest cell lives would appear to be achievable when the $B_2O_3$ to $Na_2O$ mole ratios are within the range of from about 9 to about 24 (and the $B_2O_3/SiO_2$ ratio is about the same in both the tubesheet and seal glass); i.e., preferably from about 30 to about 31.

Variations Within the Ambit of the Invention

It is highly preferred, but may not be essential, to form the ceramic powder particles in the presence of a grinding aid (such as hexadecylamine, for example). That is, the amine or equivalent compound can be combined with the powder, in any other suitable fashion, after it has been formed (as by grinding the glass without a grinding aid and sieving out the smaller particles for use as the powder, for example). The powder may, for example, be stirred with a solution of the amine in a highly volatile solvent, filtered out and dried.

It is highly preferred, but not essential, that the potted fiber ends in the tubesheet be uniformly spaced apart (or uniformly "packed"). The spacing between adjacent fiber ends can vary not only within any given cross-section but between different cross-sections along the axis of the column.

Again, it is highly preferred, but not essential, that the vertical axis of the tubesheet be coextensive with the vertical axis of the fiber, foil, etc., bundle; the tubesheet axis may be radially offset, even though this results in a varying degree of curvature in the fiber ends potted in the tubesheet.

Similarly, it is preferred that the axis of the tubesheet, if not coextensive with the axis of the fiber bundle, be at least parallel thereto. However, this is not essential; the tubesheet axis may be inclined with respect to the bundle axis.

It is highly preferred, but not essential, that the portions of the fiber lengths constituting the unpotted part of the "bundle" be disposed in parallel array. The fibers may be disposed in any otherwise suitable arrangement within the bundle from which free end portions may extend in such manner as to be gatherable into a "brush" which may be potted in a plug-shaped tubesheet in essentially the manner disclosed herein.

It is to be noted that, for the purposes of the claims appended to these specifications, a plurality of fiber bundles having end portions potted in a common tubesheet are to be considered as portions of a single "bundle". This option includes the case in which the fiber bundle is generally U-shaped and both ends of the fibers are open and terminate in the same (outer) surface of a common, plug-form tubesheet.

In another alternative, the fiber (lengths) may be either rectilinear, arched or generally U-shaped and pass at opposite ends through two separate plug-form tubesheets. In this case, both ends of the fibers will usually be open and the two tubesheets may or may not be formed simultaneously.

It will be appreciated that whenever both ends of the fibers are open, some expedient—such as plugging one end of each fiber length with a subsequently removeable wax, for example—should be resorted to in order to ensure that the slurry does not deeply enter unbroken fiber lengths during the first potting (dipping, etc., or whatever) operation, i.e., potting of the other ends of the fibers. The temperature plugs are then removed from the unpotted ends before proceeding to pot them.

It also is to be noted that the portions of the fibers which are to be "dipped" in the slurry do not have to be open. For example, closed ends may be dipped and then opened after "firing", by cutting off a terminal portion of the composite tubesheet/fiber structure. (This of course will necessitate post-firing treatment by one of several known methods to plug off any incompetent fibers.)

It should be noted that the shape of the bottom portion of the anode tank (or of the top portion of cathode tank) between the tank wall and the feedthrough which conforms to the tubesheet is not critical, although the conical shapes shown in FIGS. 2 and 3 are preferred.

Note

It is to be understood that in all embodiments of the present invention, the ratio of the average effective diameter of the unpotted portion of the fiber length bundle to the average effective diameter of the potted portion will be such that the ratio of average spacing between adjacent lengths in the potted and unpotted portions will be as specified; i.e., equal to or less than about ½.

What is claimed is:

1. A process for preparing a helium tight composite hollow fiber/plug-form tubesheet structure having utility in a high temperature battery cell, said process comprising:
    a. providing a plurality of laterally spaced apart, ceramic, hollow fiber lengths in the form of a bundle in which end portions of said lengths constitute a brush in which they are disposed in a generally parallel array and are free to flex,
    b. providing a slurry of a powdered ceramic in a liquid,
    c. forming a coherent body of said slurry in which said fiber end portions are potted by dipping said fiber end portions in said slurry and constricting said brush to a reduced diameter such that the average distance between adjacent fiber end portions is about ½ or less of the average distance between the fiber lengths in the undipped portion of said bundle, said slurry being caused by capillary attraction to flow into any of said fiber end portions which are open, to a limited extent which is substantially greater for said end portions of any fiber lengths which may be incompetent and said body being converted, by drying, heating and cooling, to a solid ceramic tubesheet through which said potted fiber portions pass in sealing engagement therewith and which together with said portions constitutes said helium tight composite tubesheet structure.

2. The process of claim 1 in which said bundle is rotated about its long axis and is subjected to vibration, while said dipping and diameter reduction is carried out.

3. The process of claim 1 comprising, as part of said construction, forming at least one encircling tie around the dipped brush.

4. The process of claim 3 comprising allowing the dipped and tie-encircled brush to partly dry and then dipping it in the same or a different such slurry to form an outer coating of slurry thereon.

5. The process of claim 1 including removing a terminal portion of said structure, the length of the removed portion being such as to include the tubesheet material in the lumens of the competent fibers but not such as to unplug any fibers which are incorpetent.

6. The process of claim 2 including removing a terminal portion of said structure, the length of the removed portion being such as to include the tubesheet material in the lumens of the competent fibers but not such as to unplug any fibers which are incompetent.

7. The process of claim 3 including removing a terminal portion of said structure, the length of the removed portion being such as to include the tubesheet material in the lumens of the competent fibers but not such as to unplug any fibers which are incompetent.

8. The process of claim 4 including removing a terminal portion of said structure, the length of the removed portion being such as to include the tubesheet material in the lumens of the competent fibers but not such as to unplug any fibers which are incompetent.

* * * * *

UNITED STATES PATENT AND TRADEMARK OFFICE
CERTIFICATE OF CORRECTION

PATENT NO. : 4,740,338

DATED : April 26, 1988

INVENTOR(S) : Daniel O. Clark; Floris Y. Tsang; Paul A. Damrow

It is certified that error appears in the above-identified patent and that said Letters Patent is hereby corrected as shown below:

Col. 5, line 40, delete "or" and insert -- of --;

Col. 7, line 42, "practice" has been misspelled;

Col. 12, line 30, "cumene" has been misspelled;

Col. 15, line 34, "encircled" has been misspelled;

Col. 15, line 62, delete "(5)" and insert -- (50) --;

Col. 18, line 52, "LIFETIMES" has been misspelled;

Col. 19, line 2, "LIFETIMES" has been misspelled;

Col. 19, line 38, delete "PB" and insert -- PA --;

Col. 19, line 66, after "$B_2O_3/SiO_2$" add a space;

Col. 21, line 8, delete "temperature" and insert -- temporary --;

UNITED STATES PATENT AND TRADEMARK OFFICE
CERTIFICATE OF CORRECTION

PATENT NO. : 4,740,338

DATED : April 26, 1988

INVENTOR(S) : Daniel O. Clark; Floris Y. Tsang; Paul A. Damrow

It is certified that error appears in the above-identified patent and that said Letters Patent is hereby corrected as shown below:

Col. 22, line 21, "constriction" has been misspelled;

Col. 22, line 31, "incompetent" has been misspelled.

Signed and Sealed this

Thirty-first Day of January, 1989

Attest:

DONALD J. QUIGG

Attesting Officer

Commissioner of Patents and Trademarks